(12) United States Patent
Koch

(10) Patent No.: US 7,207,008 B1
(45) Date of Patent: Apr. 17, 2007

(54) METHOD, SYSTEM, APPARATUS, AND COMPUTER-READABLE MEDIUM FOR INTERACTIVE NOTIFICATION OF EVENTS

(75) Inventor: Robert A. Koch, Norcross, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 697 days.

(21) Appl. No.: 09/955,653

(22) Filed: Sep. 12, 2001

(51) Int. Cl.
*G06F 3/00* (2006.01)

(52) U.S. Cl. ............... 715/736; 715/975; 715/733; 715/802; 715/790; 705/34; 705/14; 709/207

(58) Field of Classification Search ............... 345/736, 345/733, 734, 735, 738, 744, 760, 802, 790, 345/808; 709/223, 224, 203, 207; 705/34, 705/14; 715/736, 975
See application file for complete search history.

(56) References Cited

U.S. PATENT DOCUMENTS

| | | | |
|---|---|---|---|
| 5,741,668 A * | 4/1998 | Ward et al. ............... 435/69.1 |
| 5,809,242 A * | 9/1998 | Shaw et al. ............... 709/217 |
| 5,809,415 A * | 9/1998 | Rossmann ............... 455/422.1 |
| 5,858,517 A * | 1/1999 | Tagusari et al. ............ 428/209 |
| 5,959,621 A * | 9/1999 | Nawaz et al. ............... 345/733 |
| 5,963,915 A * | 10/1999 | Kirsch ............... 705/26 |
| 5,999,179 A * | 12/1999 | Kekic et al. ............... 345/734 |
| 6,011,537 A * | 1/2000 | Slotznick ............... 345/733 |
| 6,038,542 A * | 3/2000 | Ruckdashel ............... 705/9 |
| 6,055,268 A * | 4/2000 | Timm et al. ............... 375/229 |
| 6,064,977 A * | 5/2000 | Haverstock et al. ........... 705/9 |
| 6,065,054 A * | 5/2000 | Dutcher et al. ............. 709/226 |
| 6,104,704 A * | 8/2000 | Buhler et al. ............... 370/252 |
| 6,115,693 A * | 9/2000 | McDonough et al. ......... 705/10 |
| 6,341,305 B2 * | 1/2002 | Wolfe ............... 709/203 |
| 6,362,840 B1 * | 3/2002 | Burg et al. ............... 715/835 |
| 6,463,463 B1 * | 10/2002 | Godfrey et al. ............. 709/206 |
| 6,567,854 B1 * | 5/2003 | Olshansky et al. ......... 709/229 |
| 6,694,352 B1 * | 2/2004 | Omoigui ............... 709/205 |
| 6,907,447 B1 * | 6/2005 | Cooperman et al. ........ 709/203 |
| 2002/0013728 A1 * | 1/2002 | Wilkman ............... 705/14 |
| 2002/0111813 A1 * | 8/2002 | Capps ............... 705/1 |
| 2005/0050460 A1 * | 3/2005 | Bedingfield ............... 715/513 |

OTHER PUBLICATIONS

Microsoft, "The Windows Interface An Application Design Guide", 1987, pp. 54, 128-129.*

* cited by examiner

*Primary Examiner*—Kristine Kincaid
*Assistant Examiner*—Ryan Pitaro
(74) *Attorney, Agent, or Firm*—Withers & Keys, LLC

(57) ABSTRACT

A method, system, apparatus, and computer-readable medium for the interactive notification of events is provided. A notification client application program executes in a background state and receives notifications from a business application server computer that an event has occurred. The notification may include a request to display a visual indication that the event has occurred, including a description of the event. In response to the request, the notification client application program displays a user interface window on the client computer including a description of the event that has occurred. The user interface window may include hyperlinks to additional Web content regarding the event, for scheduling appointments, for purchasing goods or services, or for placing a telephone call regarding the event.

3 Claims, 11 Drawing Sheets

METHOD, SYSTEM, APPARATUS, AND COMPUTER-READABLE MEDIUM FOR INTERACTIVE NOTIFICATION OF EVENTS

TECHNICAL FIELD

The present invention generally relates to computer systems having messaging capabilities. More specifically, the present invention relates to computer systems for providing interactive notification of the occurrence of an event.

BACKGROUND OF THE INVENTION

Today's work and home lifestyles are busy ones. Many families have a large number of family members, with each family member typically leading a very busy life. Family members work, travel, play, socialize, and generally engage in a wide variety of activities. As a result of today's hectic schedules, more and more people are using computers and the Internet to help simplify their lives. For instance, people are using the Internet to buy airline tickets and to retrieve flight information, to pay bills, schedule appointments, to buy gifts for others, and to perform a myriad of other tasks. While many of these services provide a degree of convenience for users, current Internet services like these suffer from a number of drawbacks that render them less than completely helpful.

One drawback to current Internet services is that these services require users to visit a World Wide Web ("Web" or "WWW") site to obtain information or take action. For instance, if a user wants to obtain information regarding whether or not an airline flight has been delayed, the user must visit the airline's Web site and request this information. If the user does not visit the Web site, the user is unable to obtain the flight information. Because users have to "pull" information from Web sites rather than information being "pushed" to them from the Web sites, users may miss important notifications or other information. While some Web sites will send information to users via electronic mail messages, users will not receive the information if they do not check their e-mail. This can be a serious drawback for users that do not check their e-mail frequently.

Another drawback to current Internet services is that there is no convenient, unified way to manage information available from multiple sources of information, such as Web sites. So, for instance, if a user wants to obtain information regarding the status of a flight and information regarding the payment of a bill, the user must visit the both the airline Web site and a Web site that provides information regarding the bill. While some service providers will send e-mail messages with this type of information, many will not. Moreover, as mentioned above, in order to receive this information via e-mail, a user must launch an e-mail reader application and read the e-mail. If the user does not remember to check their e-mail, they will not receive the notification. This can be particularly problematic for messages containing time sensitive information. Time sensitive information contained in a message may be meaningless if a user does not check their e-mail until some time after the message is delivered.

Therefore, in light of the above, there is a need for a method, system, apparatus, and computer-readable medium for interactive notification of events that can notify a user of the occurrence of an event without requiring the user to launch and utilize an application program such as an e-mail client. There is a further need for a method, system, apparatus, and computer-readable medium for interactive notification of events that can provide notification of the occurrence of events in a convenient, unified manner so that users can receive notifications of events from multiple sources by utilizing a single consistent interface.

SUMMARY OF THE INVENTION

The present invention satisfies the needs described above by providing a method, system, apparatus, and computer-readable medium for the interactive notification of events that includes a unified, consistent interface for providing notification of events from multiple sources. Moreover, the present invention provides a method, system, apparatus, and computer-readable medium for the interactive notification of events that does not require users to manually utilize an application program, such as an e-mail client, to receive a notification that an event has occurred.

Generally described, the present invention provides a client computer, a business Web server computer, and a business application server computer. The client computer comprises a standard personal computer connected to the Internet or other type of distributed computer system. The client computer includes a standard Web browser application program for navigating and viewing files provided on the World Wide Web or another type of specialized client software.

The client computer also includes a notification client application program. The notification client application program executes in a background state and receives notifications from the business application server computer that an event has occurred. Such a notification may include a request to display a visual indication that the event has occurred, including a description of the event. In response to the request, the notification client application program displays a user interface window on the client computer including a description of the event that has occurred. The user interface window may include hyperlinks to additional Web content regarding the event, for scheduling appointments, for purchasing goods or services, or for placing a telephone call regarding the event.

The business Web server computer provides an interface that allows users to subscribe to notifications. In order to subscribe to a notification for a particular event, a user identifies the event, the arrival of an airline flight for instance, and provides a user identifier or other unique identifier. This information is then stored by the business Web server computer in a customer database. The customer database is utilized by the business application server computer when determining whether events have occurred and for transmitting a notification to a client computer that an event has occurred. The business Web server computer comprises a standard Web server computer capable of executing a suitable server operating system and a Web server application program.

The business application server computer also comprises a standard server computer and provides functionality for determining if an event has occurred and, if an event has occurred, for transmitting a request to the appropriate client computer to display a visual indication that the event has occurred. More specifically, the business application server reads event descriptions from the customer database and determines if an event has occurred. If an event has occurred, the business application server reads a user identifier from the customer database. The business application server then transmits a request to a network service provider for an network address associated with the user identifier. Once the network address corresponding to the user identifier has been received, the business application server transmits a request to the notification client application executing on the client computer located at the network address. The request instructs the notification client application to display a visual indication that the event has occurred. The visual indication may comprise a user interface window that is displayed above other open windows and may include information that is customized to a particular user of the client computer.

The present invention also provides a method, apparatus, and a computer-readable medium for providing interactive notification of events. Additional details regarding one actual embodiment of the present invention will be apparent from the detailed description that follows.

DETAILED DESCRIPTION OF AN ILLUSTRATIVE EMBODIMENT

Figure 1:
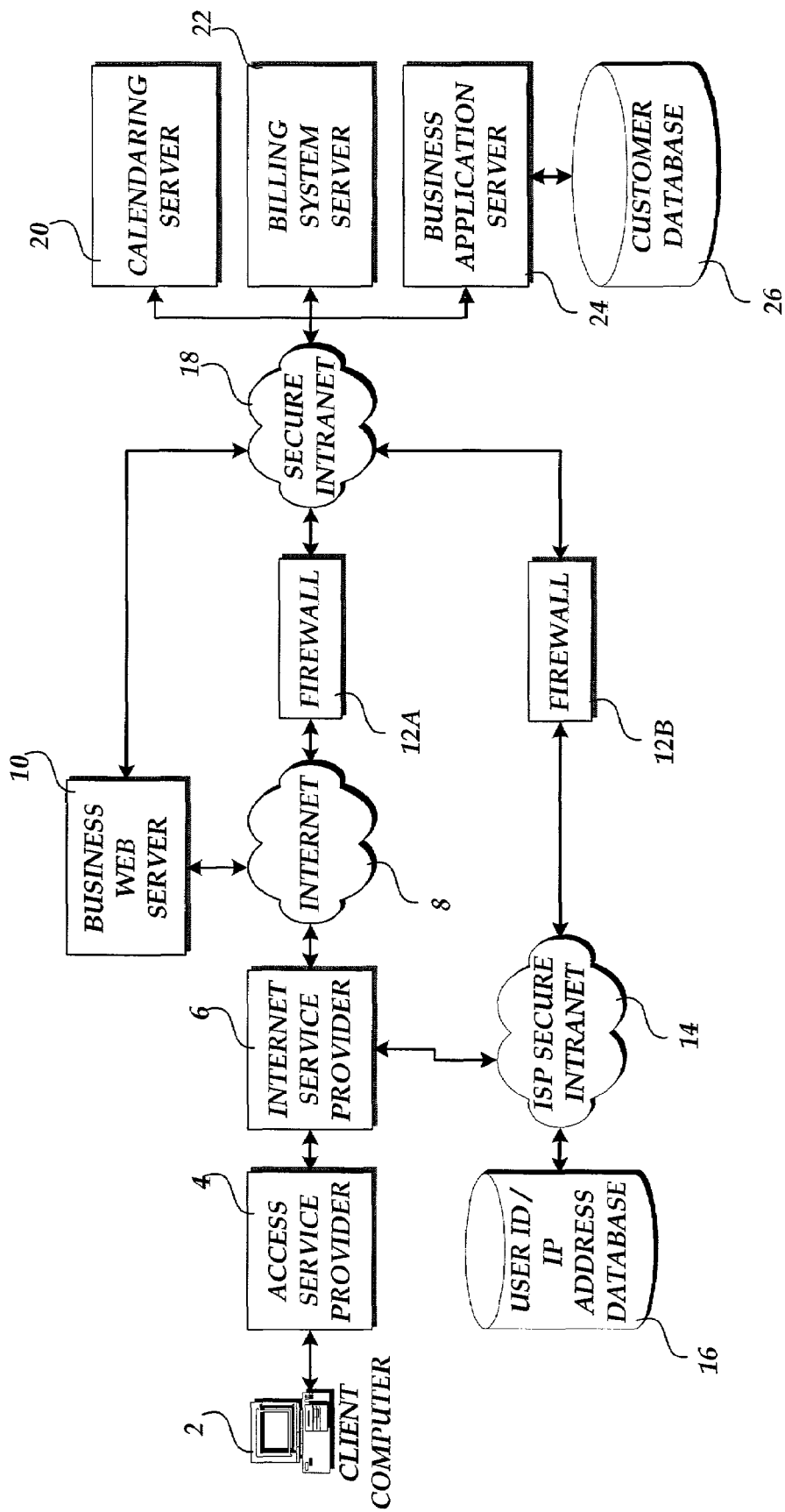
FIG. 1 is a block diagram showing an illustrative system architecture utilized in an actual embodiment of the present invention.

As described briefly above, the present invention provides a method and system for interactive notification of events. According to one actual embodiment of the present invention, an Internet Web site is provided by a business Web server computer. Through the Web site, a user utilizing a client computer may request to receive a notification that a particular event has occurred. For instance, a user may request to receive a notification when a flight arrives at an airport, may request to be notified when it is time for a dental checkup, may request to be notified in advance of a holiday, such as Mother's Day, or may request to be notified when a bill is due. Other types of event notifications may also be requested through the Web site provided by the business Web server computer. Additional details regarding the business Web server computer will be described below with respect to FIGS. 1, 5, 7, 8, and 9.

As a part of the request for a notification, a user may provide a description of the event and a user identifier. The description of the event only needs to identify the event for which the user would like notification. The user identifier comprises an unique identifier for the user. As will be described below, the user identifier is utilized to determine a network address for the user's client computer. The user may be explicitly required to provide a user identifier or it may be derived from a file on their device, such as a "cookie." Once the description of the event and the user identifier have been received from the user, this information is transferred from the business Web server computer to a business application server computer. The business application server computer contains program code for determining whether the event identified by the user has occurred. To evaluate whether an event has occurred, the business application server computer may utilize information from external systems, such as a database of airline flight data.

If the business application server computer determines that an event has occurred for which a user has requested notification, the business application server computer utilizes the user identifier associated with the request to identify a network address for the user's computer. In particular, the business application server computer queries a network service provider for a network address. Based upon the user identifier, the network service provider can determine a current network address for the user's client computer. If a network address is located, the network service provider returns the network address to the business application server computer.

Once the business application server computer has received the network address for the client computer, the business application server computer transmits a request to the client computer to display a visual indication that the event has occurred. The request may include a description of the event, hyperlinks to additional data regarding the event, and additional data for customizing the visual indication. The data for customizing the visual indication may include the user's name or other information personal to the user. Additional details regarding the business application server computer will be described below with reference to FIGS. 1, 5, 6, 8, and 10.

The client computer comprises a standard personal computer or other computing device, such as a handheld device or wireless mobile telephone. The client computer is operatively connected to the Internet. In a preferred embodiment of the present invention, the client computer is connected to the Internet through a high-speed, always-on network connection, such as a digital subscriber line ("DSL") connection, a cable modem, or a satellite connection. The client computer includes a standard Web browser for viewing and interacting with the Web site provided by the business Web server computer. The client computer also includes a notification client application for receiving requests to display visual notifications from the business server computer.

The notification client application is loaded into the memory of the client computer at startup and receives requests from the business server computer to display a notification message in response to the occurrence of the user-specified event. In response to such a request, the notification client application displays a visual indication that the event has occurred. The visual indication may comprise a user interface window including information regarding the event that is displayed above other active windows. The user interface window may include data for customizing the visual indication for a particular user, such as the user's name or other information. The user interface window may also include hyperlinks to one or more network locations having additional information regarding the event. For instance, the hyperlinks may allow the user to gain additional information regarding the event, to purchase a product or service, to schedule an appointment, or to place a telephone call regarding the event. A data message may also be transmitted in response to an event notification. Other types of information and services may also be provided through hyperlinks. Additional details regarding the operation of the client computer will be described below with reference to FIGS. 1–9 and 11.

Turning now to the figures, in which like numerals represent like elements, one actual embodiment of the present invention will be described. Those skilled in the art should appreciate that the actual embodiment described herein is illustrative and that changes may be made to the embodiment of the present invention described herein without departing from the spirit and scope of the invention.

Referring now to FIG. 1, an illustrative system architecture utilized in an actual embodiment of the present invention will be described. As shown in FIG. 1, a client computer 2 is provided that connects to the Internet 8 through an access service provider 4 and an Internet service provider 6. According to the actual embodiment described herein, the client computer 2 comprises a standard personal computer connected to the Internet 8 through a high-speed, always on connection, such as a Digital Subscriber Line ("DSL") or a cable modem. However, it should be appreciated that the client computer 2 may comprise another type of computing devices such as a handheld device or a set top box, and may be connected to the Internet 8 through another type of connection, such as a dial-up or satellite connection.

The client computer 2 is capable of executing a standard Web browser application program such as INTERNET EXPLORER from MICROSOFT CORPORATION of Redmond, Wash. The Web browser application program may be utilized to browse a Web site provided by the business Web server computer 10. The business Web server computer 10 comprises a standard server computer capable of storing Web pages and receiving and responding to requests for the Web pages. For instance, the business Web server computer 10 may be operated by an airline and may provide a Web site where users can book airline reservations, obtain the status of current flights, obtain frequent flier information, and perform other tasks.

The Web site provided by the business Web server computer 10 may also allow a user of the client computer 2 to request an event notification. For instance, the Web site may allow a user to request a notification when a particular flight has arrived. In order to provide such a notification, the business Web server computer 10 requests a description of the event, such as the flight number, and a unique user identifier for the user. The business Web server computer 10 transmits the event description and the user identifier to the business application server computer 24.

The business application server computer 24 is a standard server computer connected to the Internet 8 through a secure intranet 18 and a firewall 12A. The business application server computer 24 stores the event description and the user identifier in the customer database 26. The business application server computer 24 also performs computing functions necessary to determine whether the event described by the event description has occurred. For instance, if the event comprises the arrival of a particular airline flight, the business application server computer 24 will retrieve current flight arrival information, compare this information to the flight number for which an event notification should be provided, and determine if the particular flight has arrived.

If the business application server computer 24 determines that an event for which notification should be provided has occurred, the business application server computer 24 will retrieve the user identifier corresponding to the event from the customer database 26. The business application server computer 24 will then query the Internet service provider 6 for an Internet protocol ("IP") address for the client computer 2. Alternatively, the business application server computer 24 may have direct access to the Internet protocol ("IP") address through the firewall 12B, the ISP secure intranet 14, and the user ID/IP address database 16. The user ID/IP address database 16 associates the current IP address of a computer system, such as the client computer 2, with a user identifier.

Once the business application server computer 24 has obtained the IP address of the client computer 2, the business application server computer 24 transmits a request to the client computer 2 at the IP address requesting that the client computer 2 display a visual indication that the event has occurred. A notification client application executing on the client computer 2 receives the request and displays a visual indication that the event has occurred. The visual indication may comprise a user interface window including a description of the event that is displayed above all other active windows. Additionally, the user interface windows may include one or more hyperlinks referencing a network location having additional information regarding the event.

The user interface window may also include a hyperlink to Web sites provided by a calendaring server computer 20. The calendaring server computer 20 is a standard server computer capable of providing a Web site for scheduling appointments and for performing other tasks with a calendar. So, for instance, a user may request to be notified when it is time for their dental checkup. In response to receiving a notification from the business application server computer 24 that the checkup is due, the client computer 2 may display a notification in a user interface window including a hyperlink to the calendaring server computer 20. Using the calendaring server computer 20, the user may schedule the date and time for their dental appointment.

The user interface windows may similarly include a hyperlink to a billing system server computer 22. The billing system server computer 22 is a standard server computer that provides a Web site that allows users to pay bills, view account balances, and perform other functions. Thus, a notification window may be displayed that reminds a user that a bill is currently due. A hyperlink may be provided in the window that, when selected, connects the Web browser application program to the billing system server computer 22. At the billing system server computer 22, the user may be permitted to pay the bill and perform other account tasks.

It should be appreciated that the notification window may contain hyperlinks to other types of server computers for performing other types of tasks and that the examples provided herein a merely illustrative. Additional details regarding the client computer 2, the business Web server computer 10, the business application server computer 24, the billing system server computer 22, and the calendaring server computer 20 will be provided below.

Figure 2:
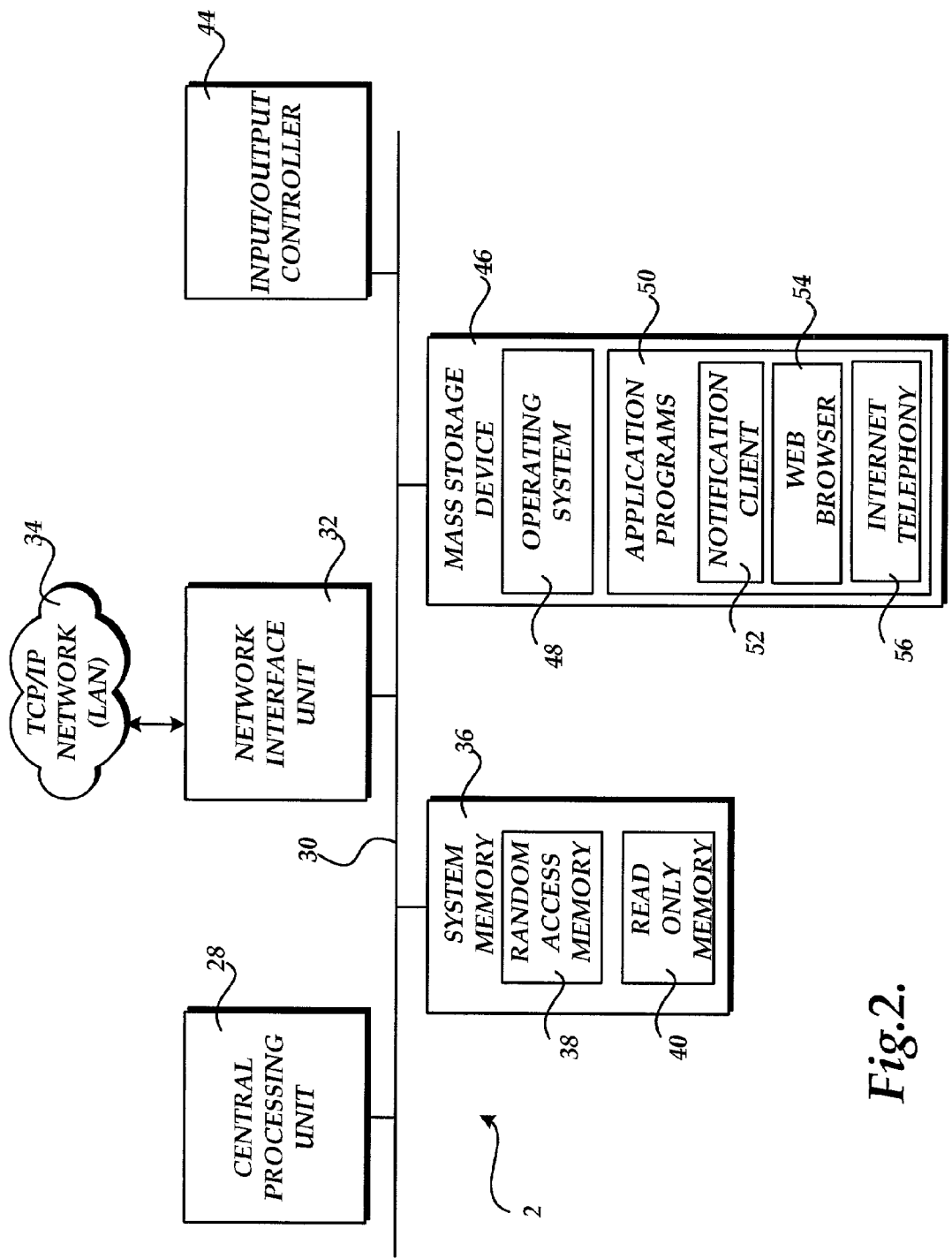
FIG. 2 is a block diagram showing a computer architecture for a client computer utilized in an actual embodiment of the present invention.

Turning now to FIG. 2, an illustrative computer architecture for the client computer 2 will be described. The computer architecture shown in FIG. 2 illustrates a conventional personal computer, including a central processing unit 28 ("CPU"), a system memory 36, including a random access memory 38 ("RAM") and a read-only memory ("ROM") 40, and a system bus 30 that couples the memory to the CPU 28. A basic input/output system ("BIOS") containing the basic routines that help to transfer information between elements within the client computer 2, such as during startup, is stored in the ROM 40. The client computer 2 further includes a mass storage device 46 for storing an operating system 48 and application programs 50. Although a conventional personal computer is shown in FIG. 2, the invention may be practiced on other types of computing devices, such as a stand-alone Web terminal, portable devices, Web-enabled telephones, and the like.

The mass storage device 46 is connected to the CPU 28 through a mass storage controller (not shown) connected to the bus 30. The mass storage device 46 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

As described briefly above, the client computer 2 operates in a networked environment using logical connections to one or more remote computers through a TCP/IP network 34, such as the Internet. The client computer 2 may connect to the TCP/IP network 34 through a network interface unit 32 connected to the bus 30. The client computer 2 may also include an input/output controller 44 for receiving and processing input from a number of devices, including a keyboard or mouse. Similarly, the input/output controller 44 may provide output to a display screen, a printer, or other type of output device.

A number of program modules may be stored in the mass storage device 46 and RAM 38 of the client computer 2, including an operating system 48 suitable for controlling the operation of a personal computer, such as the WINDOWS ME operating system from MICROSOFT CORPORATION of Redmond, Wash. Other suitable operating environments may also be used to practice the invention, such as the MACINTOSH operating environment from APPLE COMPUTER. The mass storage device 46 and RAM 38 may also store one or more application programs 50. In particular, the mass storage device 46 and RAM 38 may store a notification client application 52, a Web browser application 54, and an Internet telephony application 56.

The notification client application 52 receives requests from the business application server computer 24 to display visual indications that an event has occurred. In response to these requests, the notification client application 52 displays user interface windows containing information regarding the occurrence of the event. The user interface windows may also include hyperlinks to additional data regarding the occurrence of the event, including network sites for scheduling appointments, paying bills, or purchasing goods or services. Additionally, a command may be selected from within the user interface that launches the Internet telephony application 56. The Internet telephony application 56 may be utilized to place an Internet or traditional telephone call regarding the event. So, for instance, if the event notification concerned the arrival of an airline flight, the Internet telephony application 56 may be utilized to place a telephone call to an airline customer service representative. The Web browser application 54 comprises a conventional Web browser application program such as INTERNET EXPLORER available from MICROSOFT CORPORATION of Redmond, Wash. or NETSCAPE NAVIGATOR from NETSCAPE CORPORATION. Additional details regarding the application programs 50 will be provided below.

Figure 3:
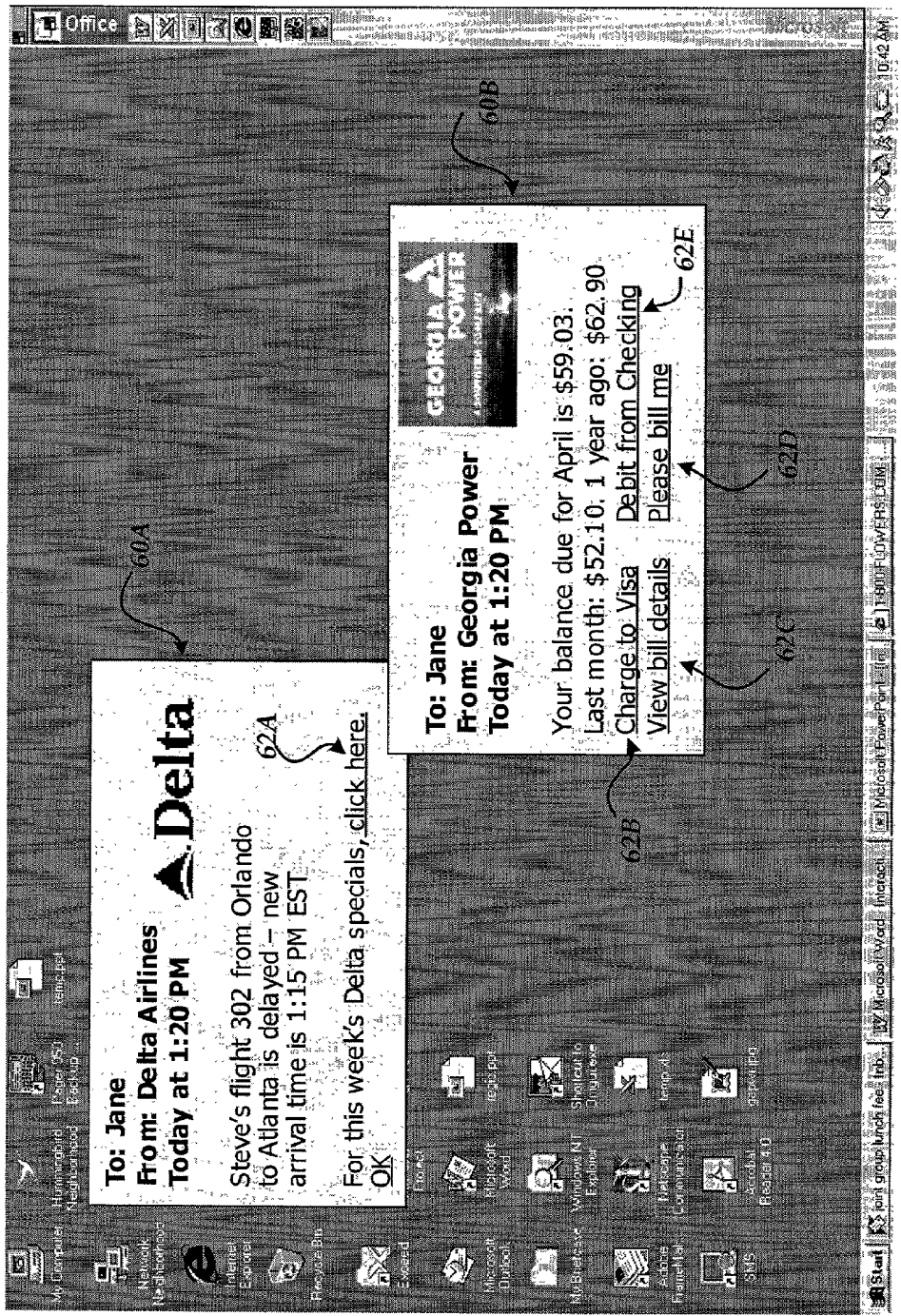
FIGS. 3 and 4 are screen diagrams showing illustrative computer displays provided by an actual embodiment of the present invention.

Referring now to FIG. 3, a screen diagram will be described that shows an illustrative computer display provided by an actual embodiment of the present invention. FIG. 3 shows a user interface desktop 58A of a standard personal computer running the WINDOWS operating system from MICROSOFT CORPORATION. Other types of operating systems may also be utilized, such as the MAC OS operating system for the MACINTOSH line of computers from APPLE CORPORATION of Cupertino, Calif.

The user interface desktop 58A includes several notification windows 60A and 60B that have been generated by the notification client application program in response to requests received from the business application server computer. The notification window 60A includes information regarding the event and is customized for the recipient of the notification. So, for instance, the notification window 60A contains text showing that "Steve's Flight 302 from Orlando to Atlanta is delayed . . . " and is customized by providing the notification addressed to "Jane." Additionally, the notification window 62A contains a hyperlink 62A that references a network location having additional information regarding the event. In particular, if the hyperlink 62A is selected, the Web browser application program is executed and directed to a network location for obtaining information regarding airline specials.

The user interface desktop 58A also shows a notification window 60B. The notification window 60B contains information regarding a due bill. The notification window 60B is customized for the user "Jane" and includes information regarding the bill, including the balance due, the amount of the previous bills. The notification window 60B also includes hyperlinks 62B, 62C, 62D, and 62E that allow the user to perform a variety of functions regarding the bill. Hyperlink 62B directs the Web browser application to a Web page where the user can charge the bill to a credit card, hyperlink 62C allows the user to view bill details, hyperlink 62D requests that the user be sent a paper bill, and hyperlink 62E requests that the bill be debited from the user's checking account. The functionality for providing these billing-related services may be provided by the billing system server computer 22 or by another server computer.

Figure 4:
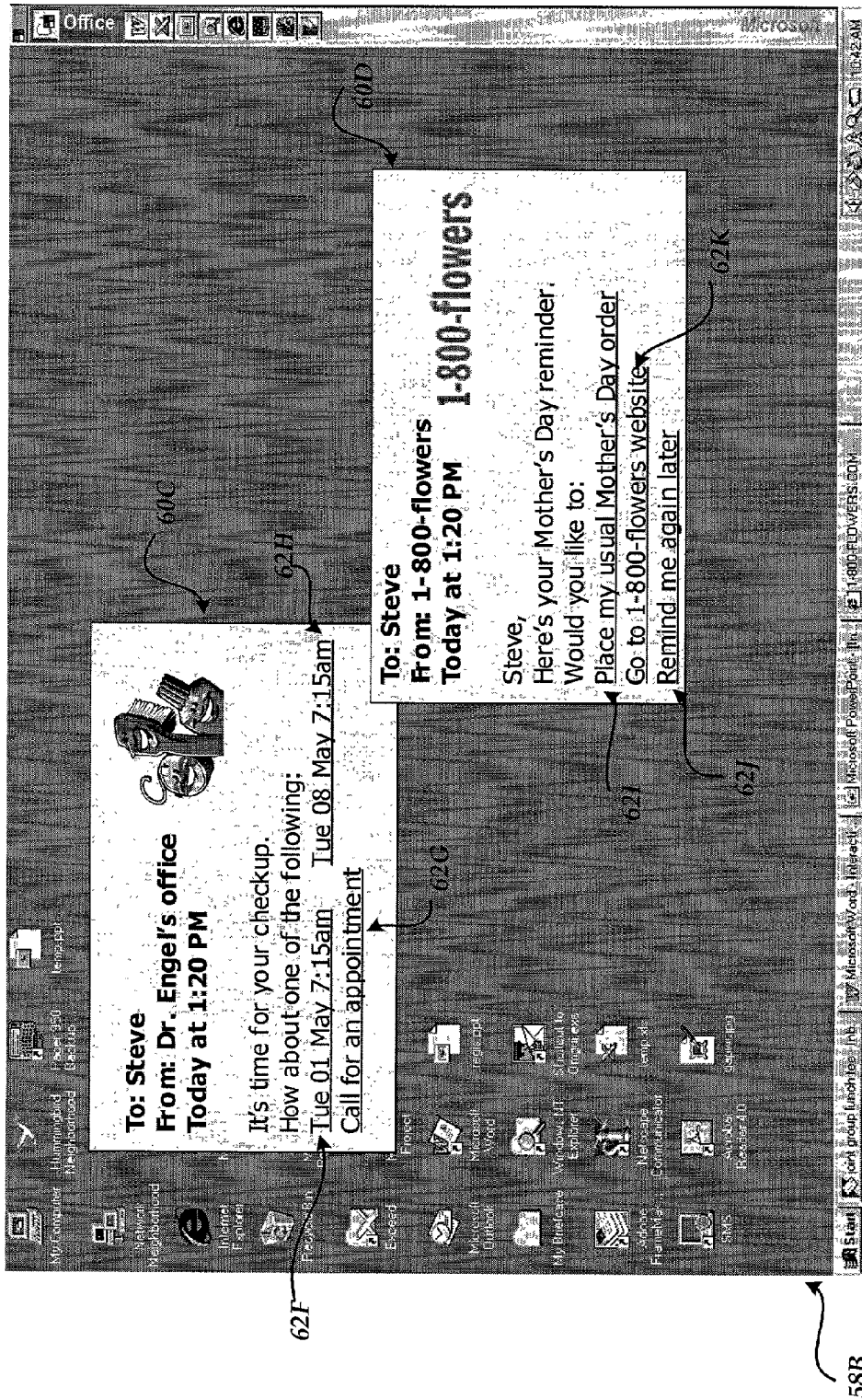

Turning now to FIG. 4, a screen diagram will be described that shows an illustrative computer display provided by an actual embodiment of the present invention. A user interface desktop 58B is shown in FIG. 4 that includes notification windows 60C and 60D. The notification window 60C contains a notification message that is customized for the user named "Steve" and includes information regarding a dental checkup. The notification windows 60C also includes hyperlinks 62F, 62G, and 62H. The hyperlinks 62F and 62H reference locations on the calendaring server computer and allow the user to schedule an appointment for the dental checkup. The hyperlink 62G launches the Internet telephony application and will place an Internet or traditional telephone call to the doctor's office so that an appointment may be scheduled.

The user interface desktop 58B also includes the notification window 60D. The notification window 60D includes a customized notification for the user "Steve" and includes a notification regarding the upcoming Mother's Day holiday. The notification window 60D also include hyperlinks 62I, 62K, and 62J, directed to network resources for placing an order for a Mother's Day present, for visiting a shopping Web site, and for providing another notification at a later date, respectively.

Figure 5:
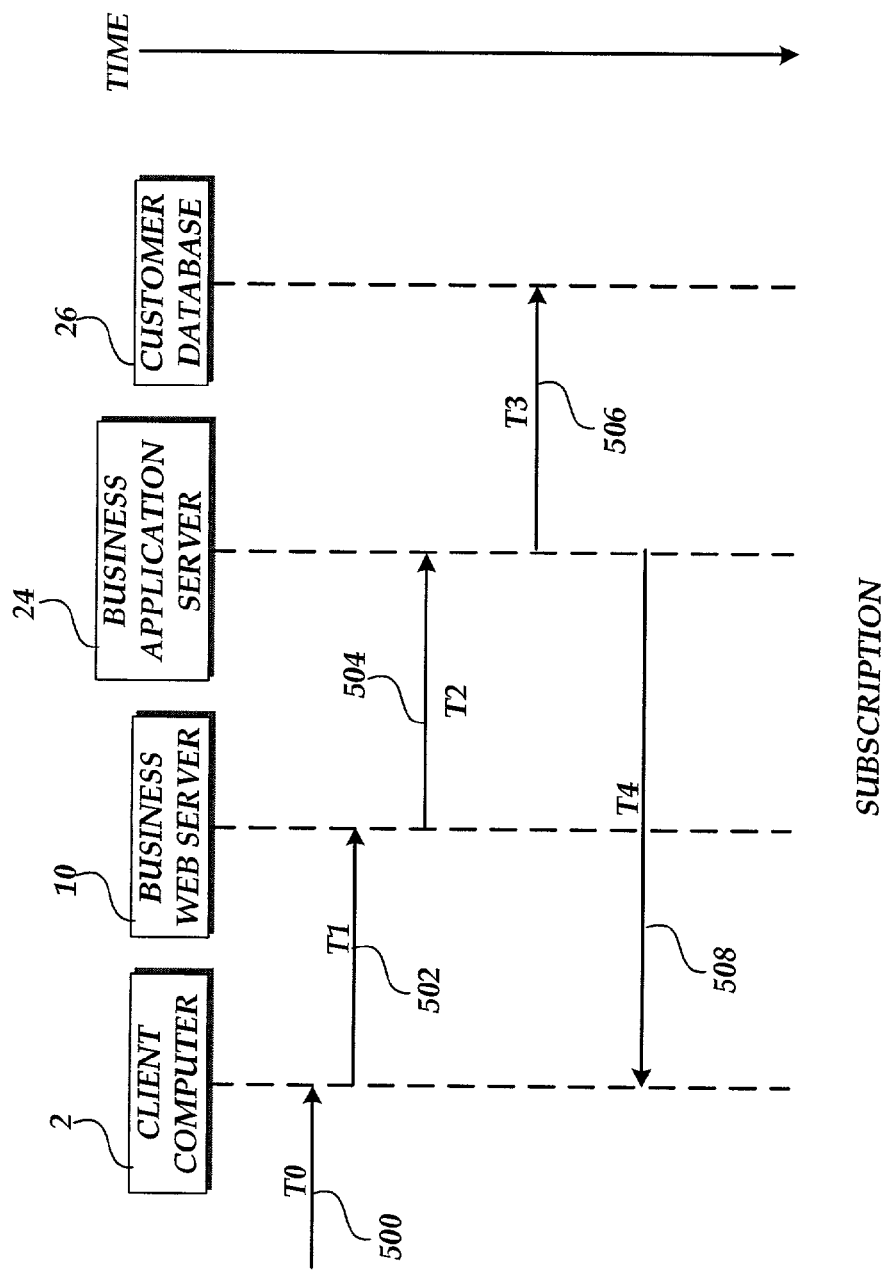
FIG. 5 is a timing diagram showing the interaction between several computer systems when a user subscribes to receive event notifications.

Referring now to FIG. 5, a timing diagram will be described that shows the interaction between the client computer 2, the business Web server computer 10, and the business application server computer 24 when a user requests to receive event notifications. At time T0 500, a user utilizes the Web browser application and enters the Web address of the business Web server computer 10. In response, the client computer 2 contacts the business Web server computer 10 at time T1 502. At time T1 502, the user also provides a description of the event for which a notification is to be provided and a unique user identifier. At time T2 504, the business Web server 10 contacts the business application server computer 24 and transmits the event description and the user identifier. The business Web server 10 saves this information in the customer database 26 at time T3 506. At time T4 508, the business Web server 10 provides a confirmation to the client computer 2 that the notification request has been received and control is returned to the Web browser application program.

Figure 6:
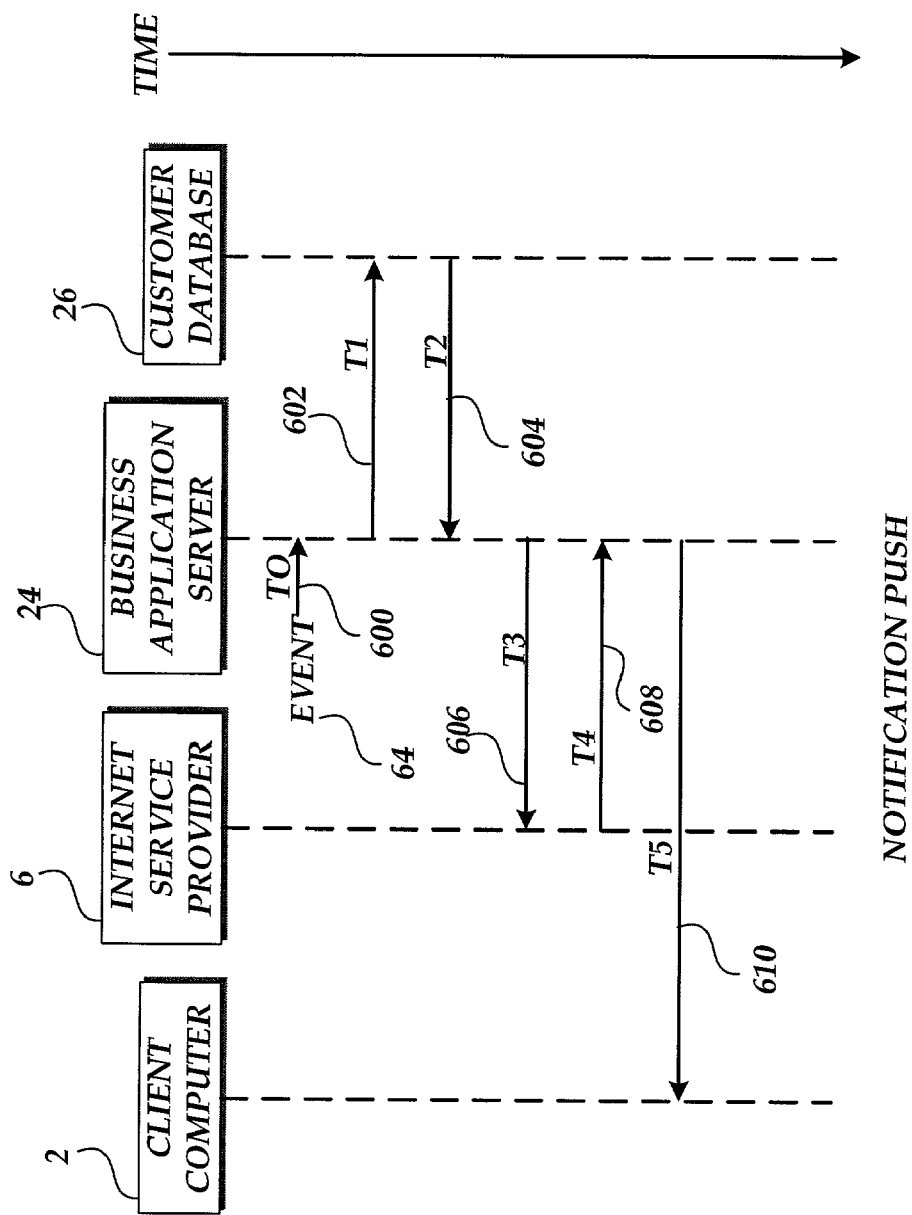
FIG. 6 is a timing diagram showing the interaction between several computer systems when the occurrence of an event is detected and a notification is transmitted to a subscribing client computer.

Turning now to FIG. 6, a timing diagram will be described that shows the interaction between the client computer 2, the Internet service provider 6, and the business application server computer 24 when the occurrence of an event is detected and a notification is transmitted to the client computer 2. At time T0 600, the business application server computer 24 detects the occurrence of an event 64 for which a notification should be provided. In response to detecting the event 64, the business application server computer 24 retrieves the user identifier associated with the event 64 from the customer database 26 at time T1 602 and time T2 604. Once the user identifier has been received, the business application server computer 24 queries the Internet service provider 6 for the IP address of the client computer 2 at time T3 606. At time T4 608, the Internet service provider 6 returns the IP address of the client computer 2 to the business application server computer 24. At time T5 610, the business application server computer 24 transmits a request to the notification client application executing on the client computer 2 to display a notification that the event has occurred. In response, the notification client application displays the notification.

Figure 7:
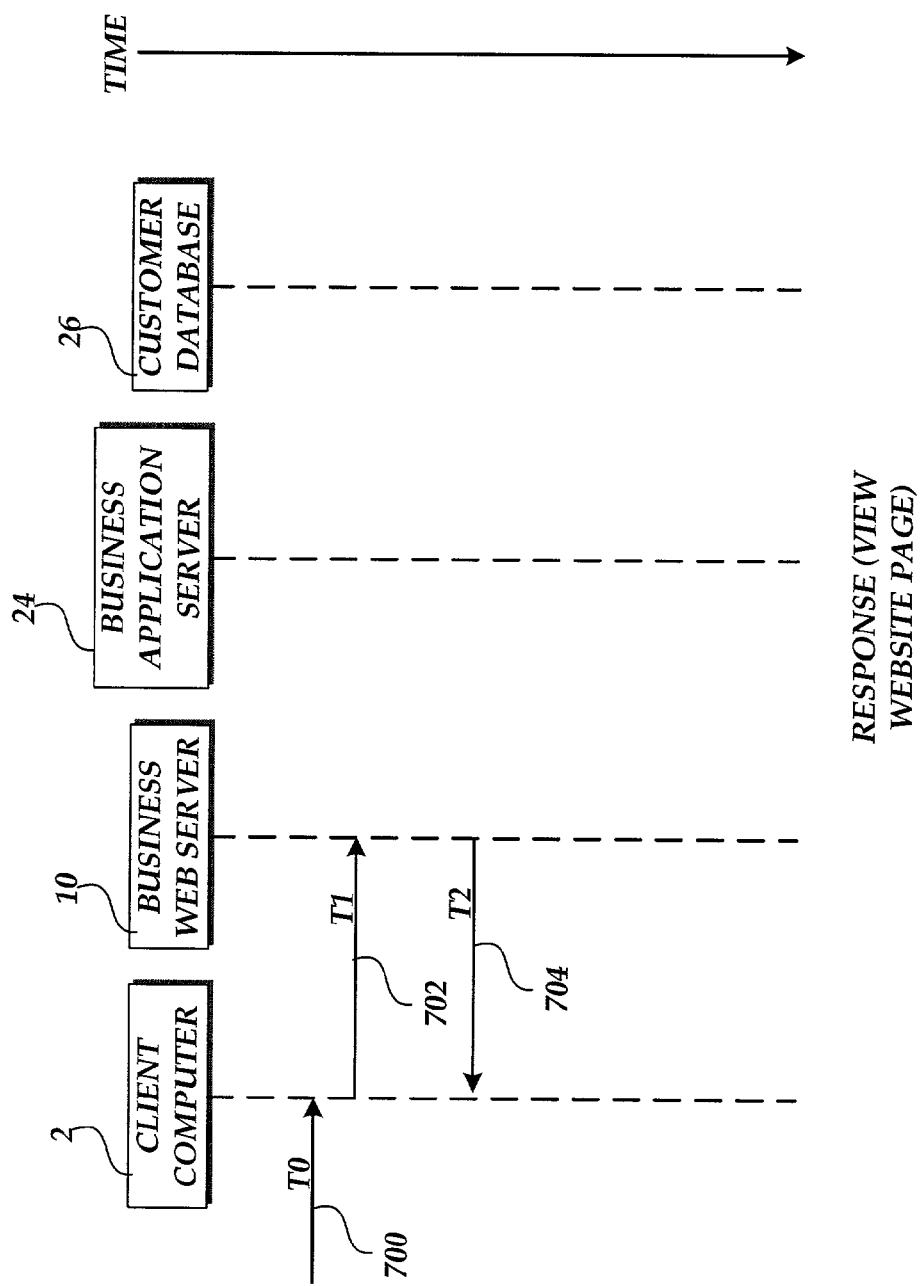
FIG. 7 is a timing diagram showing the interaction between several computer systems when a request for a Web page is transmitted in response to an event notification.

Referring now to FIG. 7, a timing diagram will be described that shows the interaction between the client computer 2 and the business Web server computer 10 when a request for a Web page is transmitted in response to an event notification. As described above, a notification window may include a hyperlink to a network resource containing additional information regarding the event for which a notification was received. If a user selects the hyperlink at time T0 700, the Web browser application program is launched and directed to the Web site provided by the business Web server computer 10 at time T1 702. The business Web server computer 10 responds to the request by providing the requested Web page at time T2 704. The hyperlink provided in the notification window may also be directed at other server computers accessible via the Internet.

Figure 8:
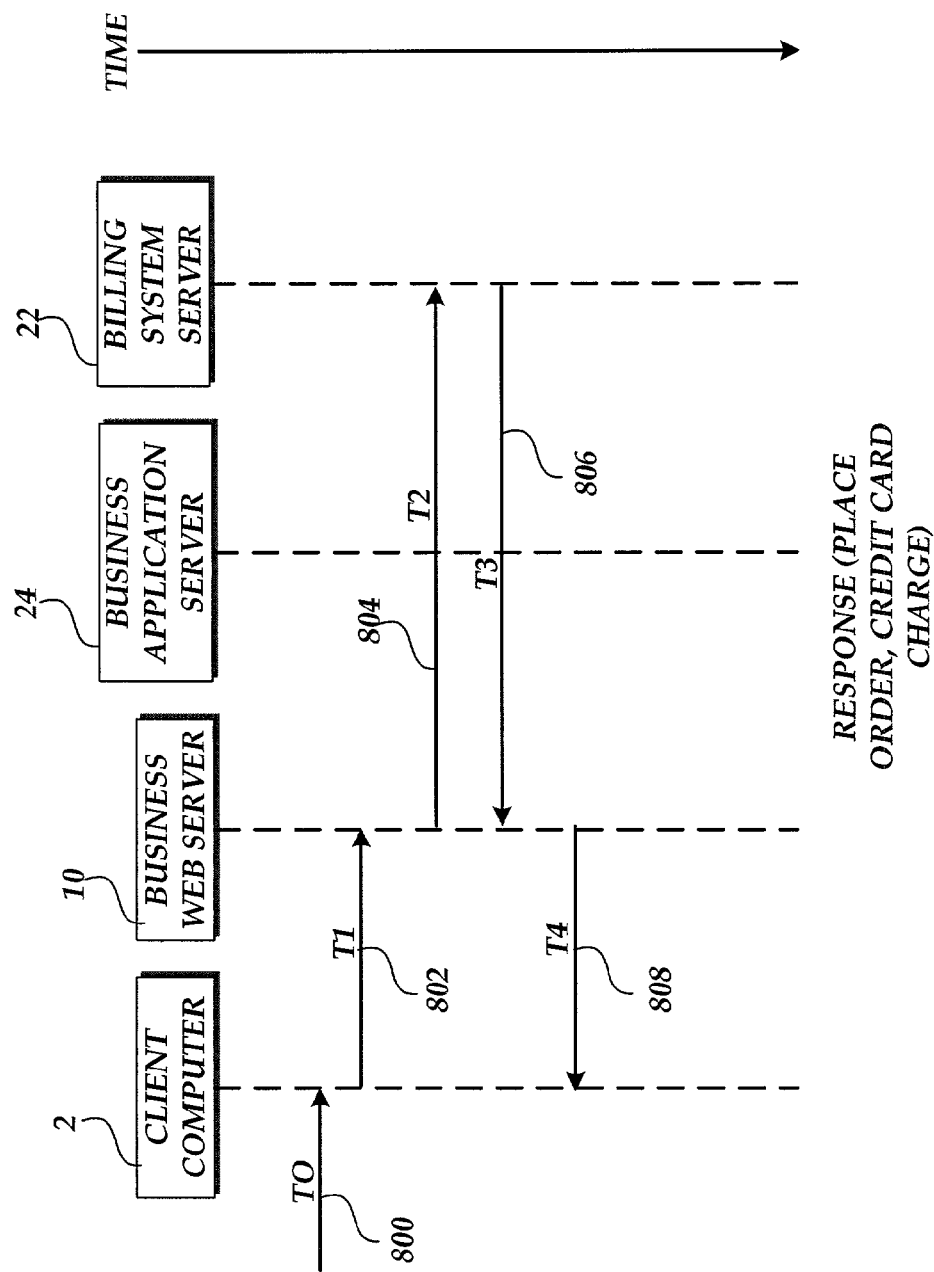
FIG. 8 is a timing diagram showing the interaction between several computer systems when a request to purchase is transmitted in response to an event notification.

Referring now to FIG. 8, a timing diagram will be described showing the interaction between the client computer 2, the business Web server computer 10, and the billing system server computer 22 when a request to purchase is transmitted in response to an event notification. As described above, a notification window may include a hyperlink to a network resource for placing an order, charging a purchase to a credit card, or paying a bill. If a user selects such a hyperlink at time T0 800, the business Web server computer 10 is contacted at time T1 802. The business Web server computer 10 then contacts the billing system server computer 22 at time T2 804. The billing system server computer 10 provides the functionality for processing credit card transactions, transmitting bills, and processing other types of e-commerce transactions. When the billing system server computer 22 has completed its processing, control is returned to the business Web server computer 10 at time T3 806. A response is then provided to the client computer 2 from the business Web server computer 10 at time T4 808.

Figure 9:
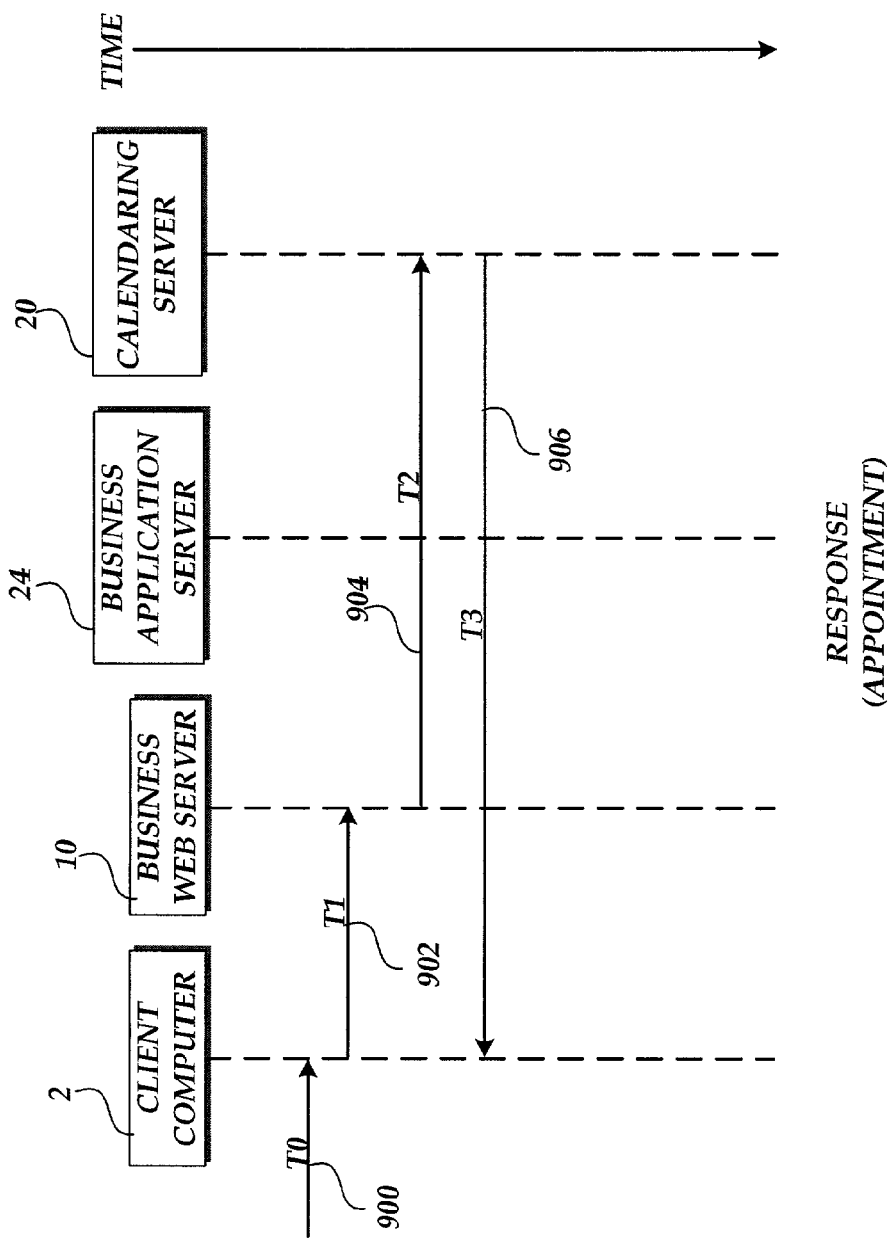
FIG. 9 is a timing diagram showing the interaction between several computer systems when a request to make an appointment is transmitted in response to an event notification.

Turning now to FIG. 9, a timing diagram will be described that shows the interaction between the client computer 2, the business Web server computer 10, and the calendaring server computer 20 when a request to make an appointment is transmitted in response to an event notification. As mentioned above, a notification window may include a hyperlink to a network resource for scheduling an appointment. If such a hyperlink is selected, a request is transmitted from the calendaring server 20 to create an appointment. In particular, if such a hyperlink is selected at time T0 900, the client computer 2 transmits a request to create an appointment to the business Web server computer 10 at time T1 902. In response, the business Web server computer 10 transmits a request to the calendaring server 20 to create the appointment. The calendaring server 20 then creates the appointment. Once the appointment has been created, the calendaring server computer 20 provides a notification to the client computer 2 that the appointment has been created. The server-based calendar may store a calendar for a business and the user. Optionally, the appointment can be entered in the server-based calendar for the business or on a local calendar stored on the client computer.

Figure 10:
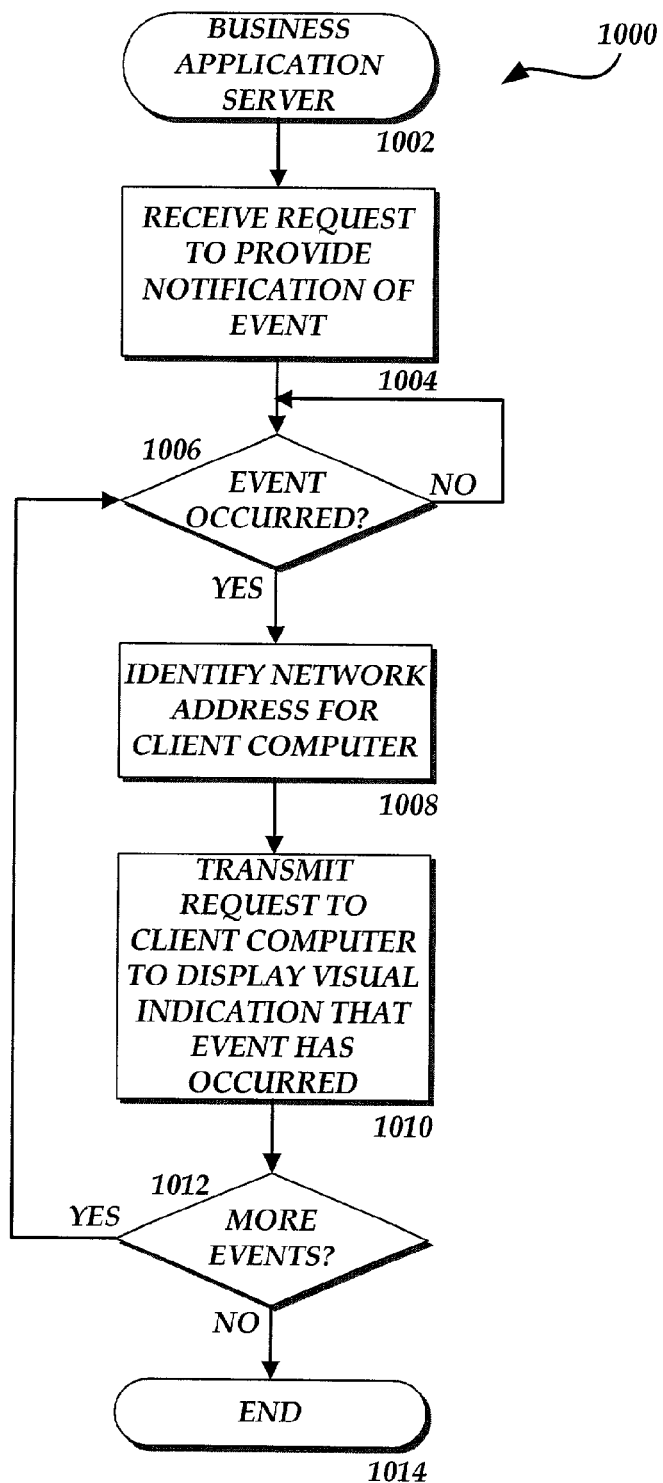
FIG. 10 is a flow diagram illustrating the operation of a business application server computer provided in an actual embodiment of the present invention.

Referring now to FIG. 10, a flow diagram illustrating the operation of a business application server computer provided in an actual embodiment of the present invention will be described. The Routine 1000 begins at block 1004, where a request is received to provide a notification that an event has occurred. The Routine 1000 continues from block 1004 to block 1006, where a determination is made as to whether the identified event has occurred. If the event has not occurred, the Routine 1000 branches back to block 1006 where another determination is made. If the event has occurred, the Routine 1000 continues to block 1008.

At block 1008, the business application server computer identifies a network address for the client computer associated with the detected event. In particular, the business application server computer transmits the user identifier associated with the event to a network service provider along with a request for the network address. In response, the network service provider provides the network address of the client computer. Once the network address of the client computer has been determined, the Routine 1000 continues to block 1010.

At block 1010, the business application server computer transmits a request to the notification client application executing on the client computer to display a visual indication that the event has occurred. As described above, the request may include information for customizing the notification for a particular user. The Routine 1000 then continues to block 1012, where a determination is made as to whether the business application server computer should determine if additional events have occurred. If additional events should be tested, the Routine 1000 returns to block 1006. Otherwise, the Routine 1000 continues to block 1014, where it ends.

Figure 11:
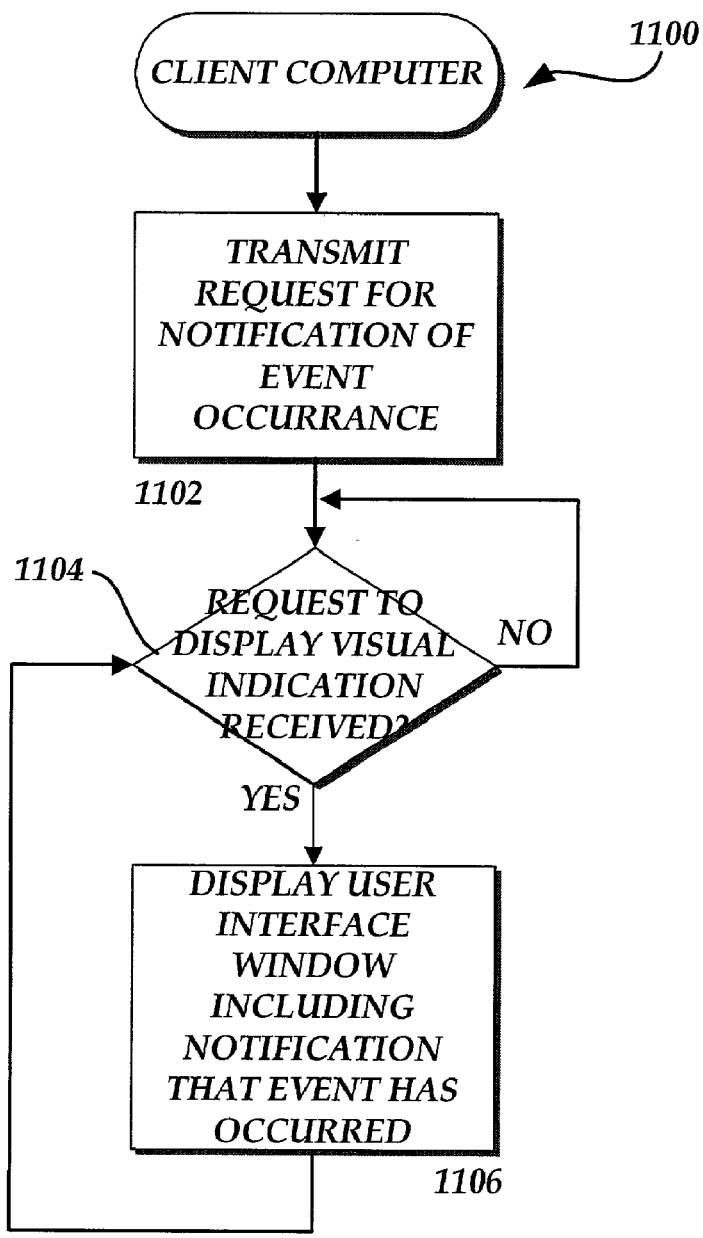
FIG. 11 is a flow diagram illustrating the operation of a client computer provided in an actual embodiment of the present invention.

Turning now to FIG. 11 a flow diagram illustrating the operation of a client computer provided in an actual embodiment of the present invention will be described. The Routine 1100 begins at block 1102, where a request for notification of the occurrence of an event is transmitted to the business Web server computer. As described above, this request is sent to the business Web server computer from the Web browser application program executing on the client computer. The Routine 1100 then continues from block 1102 to block 1104, where a determination is made as to whether a request to display a visual indication that an event has occurred has been received. As described above, the notification client application program receives these requests. If, at block 1104, the notification client application program determines that such a request has not been received, the Routine 1100 returns to block 1104 where another similar determination is made. If, at block 1104, the notification client application program determines that such a request has been received, the Routine 1100 continues to block 1106, where it displays a notification window for the event. The Routine 1100 then returns to block 1104, where another determination is made as to whether a request to display an event notification has been received.

Based on the foregoing, it should be appreciated that the present invention provides a method, system, apparatus, and computer-readable medium for providing interactive notification of events. The above specification, examples and data provide a complete description of the manufacture and use of the composition of the invention. Since many embodiments of the invention can be made without departing from the spirit and scope of the invention, the invention resides in the claims hereinafter appended.

I claim:

1. A system for providing a notification that an event has occurred, the system comprising:
   a client computer comprising an output device, a memory, a central processing unit, and a storage device containing computer-readable instructions for execution on the central processing unit, the computer-readable instructions operative to cause the client computer to transmit a request to provide a notification in response to the occurrence of the event to each of a plurality of a server computers, the request comprising a description of the event corresponding to the server computer, at least one hyperlink to additional data regarding the event data for customizing a visual indication that the event has occurred, the visual indication comprising a user name, and a user identifier, to receive from each of the server computers a request to provide a notification that the event has occurred and to open a new user interface window for each request that is received to thereby display each notification, each notification comprising a description of the event, wherein the event is a user-specified event;
   a plurality of server computers each comprising a memory, a central processing unit, and a storage device containing computer-readable instructions for execution on the central processing unit of the server computer, the computer-readable instructions operative to cause the server computer to receive the request to provide a notification from the client computer, to determine whether the event has occurred, to identify a network address for the client computer based on the user identifier in response to determining that the event has occurred, wherein the network address is an Internet protocol address, and to transmit the request to the client computer to provide a notification that the event has occurred at the network address; and
   a billing server computer, and wherein at least one of the notifications that one of the events has occurred further comprises a hyperlink, and wherein the client computer is further operative to receive a selection of the hyperlink and, based on the selection, to place an order for purchasing a product with the billing server computer.

2. A system for providing a notification that an event has occurred, the system comprising:
   a client computer comprising an output device, a memory, a central processing unit, and a storage device containing computer-readable instructions for execution on the central processing unit, the computer-readable instructions operative to cause the client computer to transmit a request to provide a notification in response to the occurrence of the event to each of a plurality of a server computers, the request comprising a description of the event corresponding to the server computer at least one hyperlink to additional data regarding the event, data for customizing a visual indication that the event has occurred, the visual indication comprising a user name, and a user identifier, to receive from each of the server computers a request to provide a notification that the event has occurred and to open a new user interface window for each request that is received to thereby display each notification, each notification comprising a description of the event, wherein the event is a user-specified event;
   a plurality of server computers each comprising a memory, a central processing unit, and a storage device containing computer-readable instructions for execution on the central processing unit of the server computer, the computer-readable instructions operative to cause the server computer to receive the request to provide a notification from the client computer, to determine whether the event has occurred, to identify a network address for the client computer based on the user identifier in response to determining that the event has occurred, wherein the network address is an Internet protocol address, and to transmit the request to the client computer to provide a notification that the event has occurred at the network address; and
   a calendaring server computer, and wherein at least one of the notifications that one of the events has occurred further comprises a hyperlink, and wherein the client computer is further operative to receive a selection of the hyperlink and, based on the selection, to create an appointment with the calendaring server computer.

3. A system for providing a notification that an event has occurred, the system comprising:
   a client computer comprising an output device, a memory, a central processing unit, and a storage device containing computer-readable instructions for execution on the central processing unit, the computer-readable instructions operative to cause the client computer to transmit a request to provide a notification in response to the occurrence of the event to each of a plurality of a server computers, wherein the event is a user-specified event, the request comprising a description of the event corresponding to the server computer, at least one hyperlink to additional data regarding the event, data for customizing a visual indication that the event has occurred, the visual indication comprising a user name, and a user identifier, to receive from each of the server computers a request to provide a notification that the event has occurred and to open a new user interface window for each request that is received to thereby display each notification, each notification comprising a description of the event;

a plurality of server computers each comprising a memory, a central processing unit, and a storage device containing computer-readable instructions for execution on the central processing unit of the server computer, the computer-readable instructions operative to cause the server computer to receive the request to provide a notification from the client computer, to determine whether the event has occurred, to identify a network address for the client computer based on the user identifier in response to determining that the event has occurred, wherein the network address is an Internet protocol address, and to transmit the request to the client computer to provide a notification that the event has occurred at the network address; and wherein at least one of the notifications that one of the events has occurred further comprises a hyperlink, and wherein the client computer is further operative to receive a selection of the hyperlink and, based on the selection, to place a telephone call.

* * * * *